March 13, 1934. T. H. STRACHAN 1,950,462

SCALE

Filed Dec. 19, 1930  3 Sheets-Sheet 1

Inventor
Thomas H. Strachan
By his Attorney
A. C. Maby

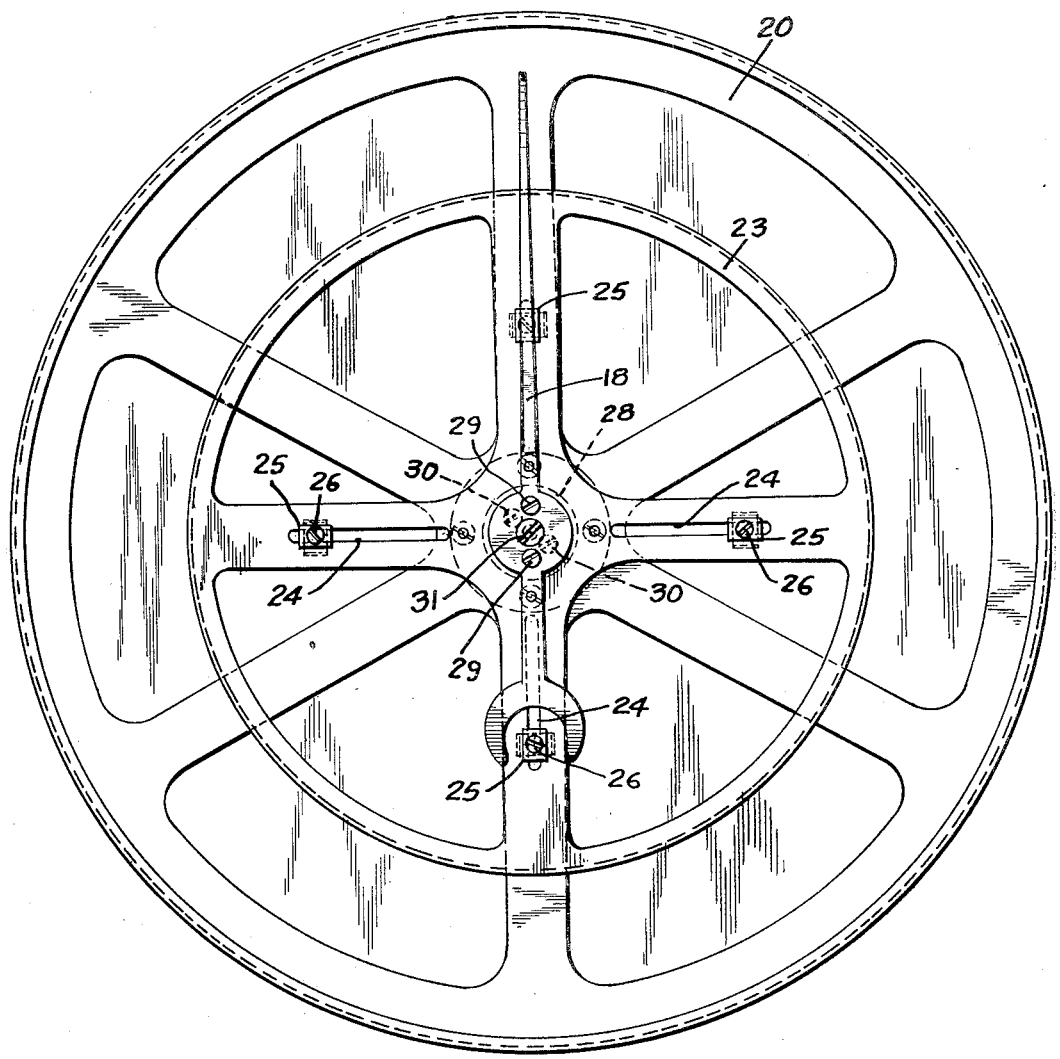

March 13, 1934. T. H. STRACHAN 1,950,462
SCALE
Filed Dec. 19, 1930 3 Sheets-Sheet 3

INVENTOR
Thomas H. Strachan
BY
ATTORNEY

Patented Mar. 13, 1934

1,950,462

UNITED STATES PATENT OFFICE 1,950,462

SCALE

Thomas H. Strachan, Dayton, Ohio, assignor, by mesne assignments, to International Business Machines Corporation, New York, N. Y., a corporation of New York Application December 19, 1930, Serial No. 503,355

10 Claims. (Cl. 265—39)

The present invention relates to weighing scales in general and particularly to scales which are designed to be suspended as a unit from a suitable hook or other support.

The primary object of this invention is to generally improve a scale of the type described by providing certain novel arrangements of parts hereinafter to be described in detail.

A specific object is to provide a novel combination comprising a movable dial, a movable pointer, and means for balancing the system about a common axis.

A further object is to provide a novel arrangement which facilitates assembly and adjustment of some of the parts mentioned in the foregoing paragraph.

Another object is to provide novel means for keeping the weighing mechanism vertical and absorbing shocks or jars due to the swinging of the mechanism during weighing operations.

Various other objects, advantages, or features of the present invention will be pointed out hereinafter or will be apparent from a study of the following specification and claims or of the accompanying drawings.

In the drawings:

Fig. 2 illustrates the construction and arrangement of the counterbalancing elements as if viewed from the right in Fig. 1.

Figure 1:
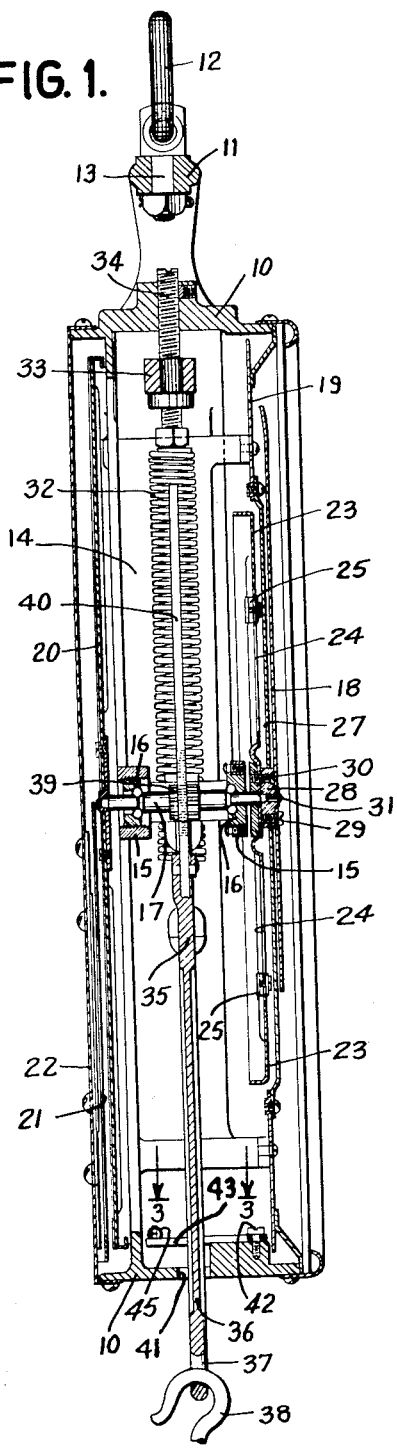
Fig. 1 is a vertical section taken through the axis of the shaft carrying the pointer.

The scale mechanism is housed in a casing 10 which may take the form of a cylindrical casting having a strap or stirrup 11 cast integral therewith to which is attached a ring 12 by means of which the scale may be hung as a unit from a suitable hook or other support. The ring 12 passes through a hole in a bolt 13 which has a swivel connection to the strap 11 whereby the scale may be turned about a vertical axis to suit the convenience of a person using the scale. The casing 10 has integral therewith an interior frame which is composed of two vertically extending and substantially parallel members 14, only one of which is shown in the drawings, and cross members 15 which support anti-friction pivot members 16 carrying the pointer shaft 17.

Figure 5:
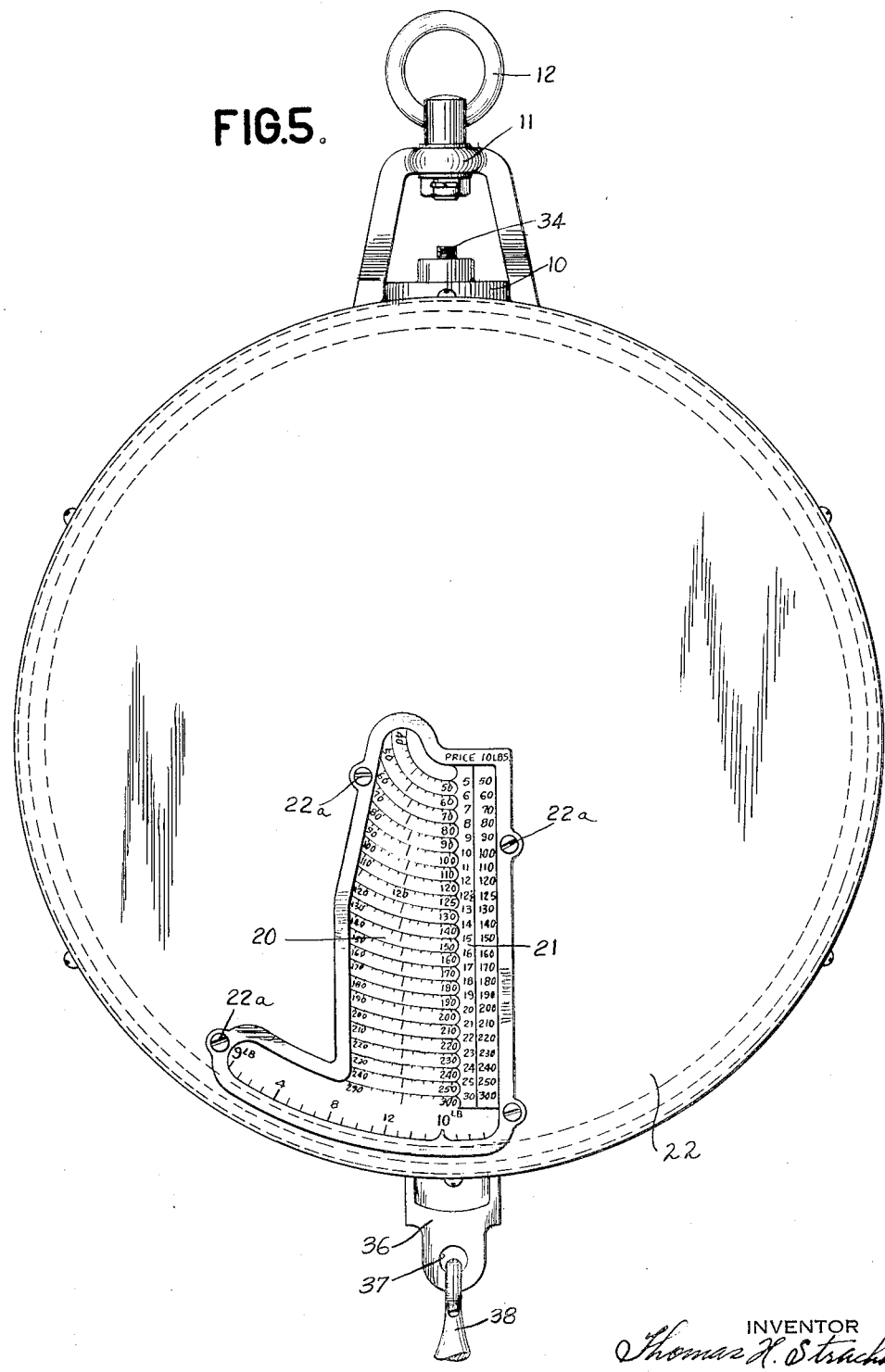
Fig. 5 is a vertical elevation of the scale as viewed from the left in Fig. 1 and illustrates the merchant's side of the scale.

One of the novel features of the present invention is the manner in which the weight and price indicators are balanced. Mounted upon the right end of the shaft 17 is a pointer 18 which cooperates with a fixed dial 19 to indicate to the customer the weight of an article in the load support. Fixed to the other end of the shaft 17 is a spider 20 bearing a chart having a plurality of series concentric price graduations corresponding to prices indicated by a price face 21 attached to a cover plate 22 by means of screws 22a (see Fig. 5), the cover plate having an opening therein permitting a view of the price face and the spider 20. The shaft 17 has fixed to its right end a balancing member 23 which is provided with a plurality of radially disposed slots 24 slidably mounted within which are counterbalancing elements 25. The elements 25 are adjustable relative to the center of shaft 17 and may be locked in place by means of screws 26. It will be clear that the entire assembly comprising the pointer 18, spider 20, member 23, and the shaft 17 may be balanced by suitably adjusting the elements 25 relatively to the center of shaft 17. The dial 19 is provided with a large central opening slightly larger in diameter than the member 23 to permit ready insertion and removal of said member in assembling the scale. The opening referred to is closed by a plate 27 after the parts have been assembled, said plate 27 having an opening in its center through which extends a spider 28 supporting the pointer 18 and also attached to the member 23.

Screws 29 hold the pointer 18 in place while screws 30 hold the member 23 to the spider 28 while a central screw 31 holds the spider 28 integral with the shaft 17 which is flattened slightly to fit a flat portion of the hole in spider 28 to prevent the latter from turning relative to the shaft 17.

The load counterbalancing members consist of springs 32 of which there are two, both being suspended from a cross bar 33 which is adjustably supported by the casing 10 by means of a screw 34 and connected to a member 35 having a downwardly extending arm 36 provided with an eye 37. A load support such as a scale pan (not shown) may be suspended from the eye 37 by any suitable means such as a hook 38 formed as a part of the load support. The member 35 is connected to the shaft 17 by means of a pinion 39, rigidly mounted upon said shaft, which meshes with a rack 40 pivotally connected to the member 35. It will be clear that displacement of the member 35 according to the load on the scale pan will be communicated proportionately to the pointer 18 and spider 20.

Figure 3:
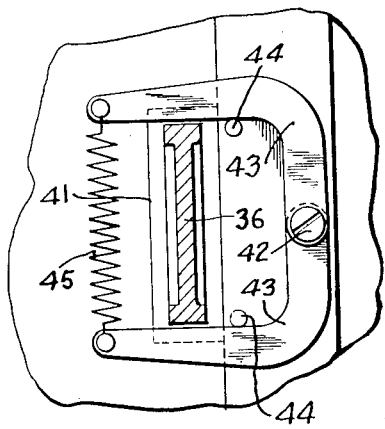
Fig. 3 is a horizontal section taken on the line 3—3 of Fig. 1.
Figure 4:
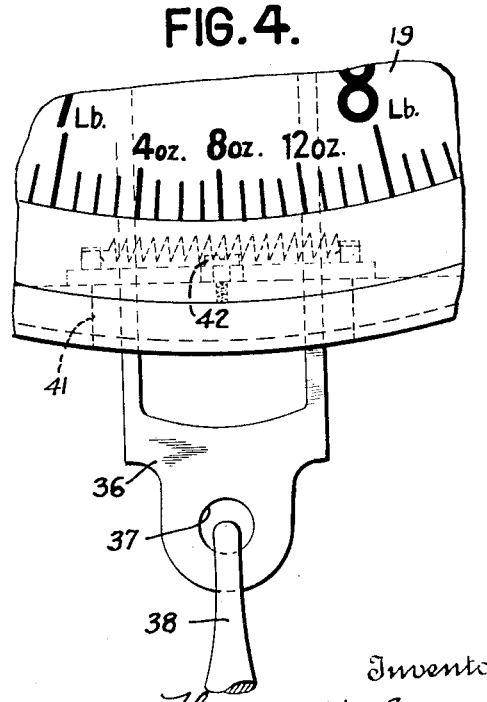
Fig. 4 is a vertical elevation of a portion of the lower part of the scale as if viewed from the right in Fig. 1, that is, it is a view of the lower part of the customer's side of the scale.

There is provided novel mechanism for checking undesirable swinging of the equalizing member 35 and the springs 32 and also to keep the weighing mechanism vertical. The casing 10 has an opening 41 in the lower part thereof through which passes the downwardly extending portion 36 of member 35. Pivotally mounted upon a flattened portion of the interior of the casing 10 by means of a common pivot 42 are two bent members 43, the free ends of which are drawn together against fixed stop pins 44 by means of a spring 45 which is attached to the free ends of both members. The members 43 extend to the left (Figs. 1 and 3), one on each side of the portion 36 of member 35, and are prevented from being drawn against said portion in a manner to bind the portion 36 owing to the presence of the stop pins 44 which allow the member 35 to move vertically without restriction.

It will be clearly seen that the members 43 serve as guides which keep the member 35 and the springs 32 vertical and at the same time act as shock absorbers to prevent the jars due to swinging movements of the load support, member 35 and springs 32 from adversely affecting the scale mechanism since one or the other of the members 43 will yield slightly according to the direction of the swinging movement imparted to the weighing mechanism.

The present invention, for sake of clearness and illustration only, has been described as embodied in a specific form, however, it is not desired to limit its application to the precise form shown as it is capable of adaptation and alteration to suit varying conditions found in practice.

I claim:

1. In a scale, a cylindrical casing, a shaft journalled therein, a pointer fixed to one end of said shaft, a dial carried by the casing and cooperating therewith and graduated in terms of weight, a dial fixed to the other end of said shaft and movable therewith and having a series of graduations proportional to weight, a plurality of load counterbalances supported by said casing, a load actuated element extending external to the casing and carried by the counterbalancing members, means connecting said element and the shaft whereby said shaft responds to movements of said element, a member mounted upon said shaft, and a plurality of elements mounted on said member and adjustable radially thereon for balancing said pointer, shaft, and the movable dial about their axis of rotation.

2. In a scale, the combination of weighing mechanism, a shaft controlled thereby and rotatable in accordance with displacements of the weighing mechanism, a pointer carried by said shaft, a member carried by said shaft having a plurality of radially movable balancing elements adjustable to balance the shaft, pointer, and member about their axes of rotation; and a stationary weight dial cooperating with said pointer and having a central opening to permit assembly and adjustment of said member, said shaft, and said pointer.

3. In a scale, the combination of weighing mechanism comprising load counterbalancing means, and load controlled means connected thereto including a vertically disposed member, and means for keeping the member substantially vertical and preventing lateral movement thereof comprising a plurality of elements yieldingly mounted one on each side of said member and tending to resist any tendency of the weighing mechanism to swing.

4. In a scale, the combination of a casing, weighing mechanism comprising a plurality of load counterbalancing members suspended from and within said casing in the upper part thereof, a load supporting element, and means for suspending the load supporting element from the counterbalancing members, said means passing through an opening in the lower part of said casing, and means for restraining the tendency of the weighing mechanism to swing about its point of suspension and relative to the casing comprising a plurality of elements pivotally mounted in the lower part of the casing adjacent said opening and extending one on each side of the first named means, a stop for each of said last named elements for limiting movements of the latter toward the first named means, and a spring connected to each of the last named elements for restraining movements of the latter under the influence of swinging movements of the first named means relative to the casing.

5. In a scale the combination of a casing, weighing mechanism suspended from and within the upper part of the casing and having a part extending through an opening formed in the lower part of said casing, and means for resisting any tendency of the weighing mechanism to swing about its point of suspension and relative to said casing, comprising a pair of elements having a common pivotal connection to said casing adjacent said opening and arranged one on each side of the part of the weighing mechanism extending therethrough, means for limiting movement of said elements toward said part, and yielding means for restraining movements of said elements away from said limiting means under the influence of swinging movements of said part.

6. In a scale, the combination of weighing mechanism comprising load counterbalancing members, a load supporting element, and a member suspended from the load counterbalancing members for carrying the load supporting element, and means for keeping the weighing mechanism vertical comprising a plurality of members yieldingly mounted one on each side of the member suspended from the load counterbalancing members and tending to resist any tendency of the weighing mechanism to swing.

7. In a scale, a load responsive element movable vertically and horizontally, a pair of pivoted members, one on each side of said element, a spring connecting the members to urge them toward said element, and means for limiting movement of the members toward said element to prevent contact therewith when said element moves vertically, said members being spread apart when the element moves horizontally to resist horizontal movement of the element.

8. In combination, weighing mechanism movable in a certain direction in response to a load, said mechanism also movable laterally of the direction of aforesaid movement, a support for the weighing mechanism, and pivoted members mounted in the support and adapted to yield in response to lateral movement of the weighing mechanism to prevent excessive lateral movement of said mechanism.

9. In combination, an element movable in a certain direction in response to a load, said element being also capable of movement laterally of aforesaid direction in response to the load, and a pair of elements pivotally and yieldingly mounted one on each side of said element to limit said lateral movement.

10. In combination, a load responsive element movable in one direction in response to the load and also movable laterally of said direction in response to the load, a plurality of elements pivotally mounted on a common center and extending on each side of said element to limit lateral movement, and means connected to said elements for damping said lateral movements.

THOMAS H. STRACHAN.